United States Patent Office 3,658,895
Patented Apr. 25, 1972

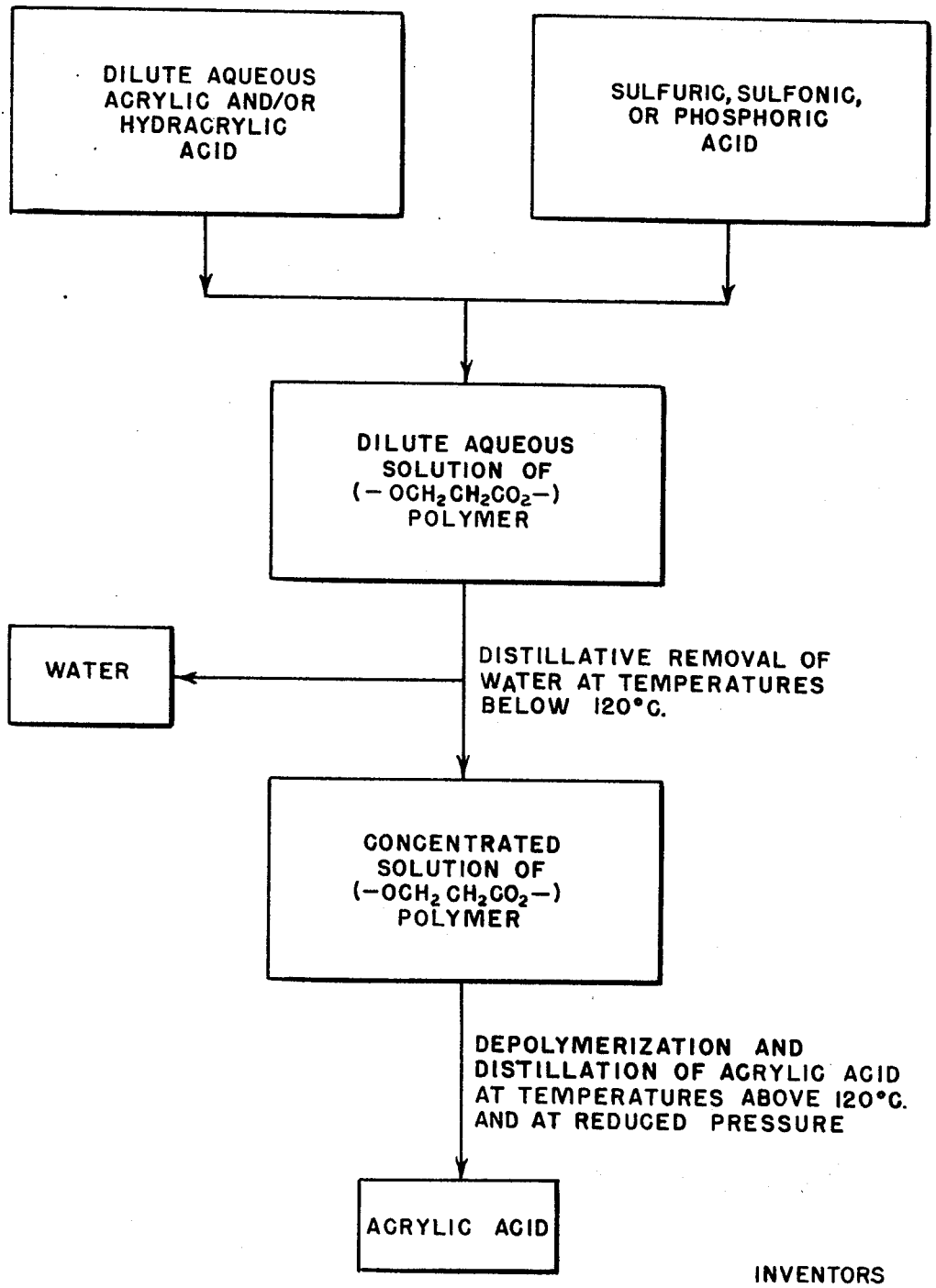

3,658,895
PREPARATION OF CONCENTRATED ACRYLIC ACID BY TREATMENT WITH A MINERAL ACID AND DUAL STAGE DISTILLATION
Karl Heinz Riemann, Darmstadt-Eberstadt, and Carl Theodor Kautter and Ulrich Baumann, Darmstadt, Germany, assignors to Rohm & Haas G.m.b.H., Darmstadt, Germany
Filed Sept. 17, 1968, Ser. No. 760,343
Claims priority, application Germany, Sept. 23, 1967, R 46,967
Int. Cl. B01d 3/34; C07c 51/26, 51/44
U.S. Cl. 260—530 N                 8 Claims

ABSTRACT OF THE DISCLOSURE

Process for recovering acrylic acid from dilute aqueous solutions thereof by adding sulfuric acid or a phosphoric or sulfonic acid, distilling off water below 120° C., and then heating at 120° C. to 200° C. to distill off acrylic acid.

---

The present invention relates to the preparation of concentrated acrylic acid by recovery thereof from a dilute aqueous solution of acrylic or hydracrylic acids.

When acrylic acid is prepared by the catalytic oxidation of propylene or acrolein using atmospheric oxygen, the acid is obtained in the form of a dilute aqueous solution. The concentration of this solution may be between 5 and 20 percent, depending on the process. Similar solutions, which may possibly also contain sulfuric acid and ammonium sulfate, are obtained in other processes for making acrylic acid, for example by the hydrolysis of acrylonitrile or acrylamide, or by the reaction of ethylene cyanohydrin with sulfuric acid. In order to obtain pure acrylic acid, the aqueous solutions are dehydrated by azeotropic distillation after introduction of an azeotroping agent, and the acrylic acid is recovered from the residue by vacuum distillation. Distillation of dilute aqueous solutions of acrylic acid is not practical from an economical viewpoint because the boiling behavior of these solutions would require columns having a very high number of theoretical plates. Considerable losses due to polymerization would also be unavoidable.

According to U.S. Patent 2,469,701, aqueous solutions comprising about 80 percent of acrylic acid are obtained when hydracrylic acid is continuously introduced into 85 percent phosphoric acid or 95 percent sulfuric acid at 130° C.–190° C. under reduced pressure, and the acrylic acid and water cleavage products are simultaneously distilled off.

Another technical synthesis of acrylic acid proceeds from β-propiolactone, which is polymerized to an oligomeric compound having a polyester structure and an acrylester end group. This oligomer cleaves thermally at about 150° C.–200° C. to form acrylic acid. Since β-propiolactone is relatively expensive, this synthesis has not proved competitive. A further synthesis of the polyester obtainable from β-propiolactone is known from French Patent 1,490,019. This involves the polyaddition of acrylic acid in the presence of alcohols and large amounts of sulfuric acid. The polyester formed has an ester end group corresponding to the alcohol, so that acrylic ester units are obtained on cleavage of this end group. Under the reaction conditions, the carboxyl end group which is freed by removal of one molecule of acrylic ester from this polyester is spontaneously esterified, so that an acrylic acid ester is exclusively obtained as the cleavage product.

According to the present invention, a process has now been found for the preparation of concentrated acrylic acid by recovery from a dilute aqueous solution of acrylic and/or hydracrylic acid, in which process the aqueous solution is mixed with an amount of sulfuric acid, an organic sulfonic acid, or a phosphoric acid which is from about 0.1 to about 5 times the weight of acrylic or hydracrylic acid. The mixture is preferably then heated from about 60° C. to 120° C. for at least one hour. The water is then largely or completely distilled off at a temperature under 120° C., and the residue is heated under reduced pressure at a temperature of 120° C. to about 200° C. to remove acrylic acid therefrom.

Several chemical reactions occur in this process. These reactions are not completely clear in detail but can be deduced from the scientific literature possibly to pursue the following course. Under the influence of the acid added to the mixture, a chemical equilibrium between acrylic acid and hydracrylic acid is established in the aqueous solution, which equilibrium strongly favors formation of hydracrylic acid. If now the water is distilled off, preferably under reduced pressure, surprisingly no cleavage of hydracrylic acid to acrylic acid and water takes place, as would be expected from the work of Wislicenus (Liebigs Annalen der Chemie, 166, page 23) and according to the process of U.S. Patent 2,469,701. Rather, the hydracrylic acid condenses to a polyester of the formula R—CO—(OCH$_2$CH$_2$CO)$_n$—OH, wherein R is CH$_2$=CH— or HOCH$_2$CH$_2$—, and $n$ is a number between about 2 and 20. This polyester, which also is formed in the polymerization of propiolactone, can be cleaved by heating to form acrylic acid.

Acrylic acid is obtained according to the process of the invention in a concentration of 90 to 95 percent, and can be completely purified by freezing or by a further distillation if this is made necessary by the use to which the acid is to be put. The yield, calculated on the acrylic acid present in the initial aqueous solution or on the equivalent amount of acrylic acid contained in the hydracrylic acid therein, amounts to about 90 percent. A portion amounting to about 5 percent of the starting material is removed with the water as a 0.5–1 percent aqueous solution of the acid. In most cases it is possible to recover this portion of acrylic acid too, if the aqueous distillate is used in the preparation of additional aqueous solution useful as starting material, for example if it is used as wash water in the gas phase oxidation of propylene or acrolein. The separation of other impurities from the solution, e.g. acetic acid, propionic acid, acrolein, and maleic acid, is effected by distillation before or after the addition of acid thereto, depending on the physical properties of the impurities. Sometimes they are removed together with water. The acid remaining after cleavage of the oligoester and distillative removal of the acrylic acid can be used for a further charge or can be returned in a cyclic process. In order to avoid a concentration of non-volatile impurities in the acid, it is suitable to discard a portion thereof after each charge, or to remove a portion from the cycle, or to purify the acid with suitable materials such as activated charcoal or bleaching earth. Further, the impurities can be oxidatively removed, for example by combining the acid with concentrated nitric acid and heating.

The process of the present invention can be used to treat very dilute solution of acrylic acid and/or hydracrylic acid, for example solutions having a content of only 2 to 5 percent of these acids. An upper limit for the content of acrylic and/or hydracrylic acid in the starting material cannot be specified. However, the use of the process to treat solutions of a concentration above about 50 percent is presently of interest only in particular cases, for example when impurities having boiling points close to that of acrylic acid are to be removed. Otherwise, at these concentrations regular distillation is generally sufficient for purification. The process has greatest significance for treating the 10–20 percent acrylic acid solutions which are obtained by the gas phase oxidation of propylene or acrolein. Acrolein is suitably distilled from these solutions before the addition of acid thereto.

The addition of a stabilizer for the inhibition of free radical polymerization can be advantageous if there is a tendency for the mixture to polymerize at any given stage. Impurities present can promote polymerization or inhibit polymerization, depending on particular conditions. In case they are necessary, conventional stabilizers such as copper sulfate, hydroquinone, induline, methylene blue, and the like can be employed. The distillation columns used are suitably equipped with copper packing, at least in part.

As an acid catalyst for the establishment of the acrylic acid-hydracrylic acid equilibrium or for the polycondensation, any strong, non-oxidizing acid which is involatile under the temperature and pressure conditions at which acrylic acid is distillatively removed can in principle be employed. However, for reasons of economy the process is carried out technically with sulfuric acid, organic sulfonic acids, or a phosphoric acid. These acids can be employed in pure form or in the form of an aqueous solution. Because of the need to remove water by distillation, the pure acids are preferred. Sulfuric acid is the most economical of the acids named and since it also gives good results is preferably employed. Among the organic sulfonic acids, the aromatic mono and polysulfonic acids, particularly of benzene, alkyl benzenes, and naphthalene, such as toluene sulfonic acid, benzene sulfonic acid, and naphthalene mono- and di-sulfonic acids, are of principal interest. However, alkyl sulfonic acids may also be employed, particularly lower alkyl sulfonic acids. Among the phosphoric acids, orthophosphoric acid is the most important for the process of the invention, but pyrophosphoric acid and polyphosphoric acid are also suitable. Mixtures of these acids, particularly of the phosphoric acids, can also be used.

The amount of acid added should be from about 0.1 to about 5 times the weight of the acrylic or hydracrylic acid involved. Sulfuric acid gives good results even at the lowest concentrations in this range. Large quantities of acid within the range mentioned are used only for the weaker acids such as polyphosphoric acid.

If solutions of hydracrylic acid are treated according to the invention, the water may be distilled off directly after addition of the acid. However, if aqueous solutions of acrylic acid are employed, the equilibrium between acrylic acid and hydracrylic acid should first be established so that the least possible amount of acrylic acid is distilled off together with the water. The establishment of equilibrium conditions takes place slowly, even in the presence of a large excess of water. The attainment of equilibrium can be accelerated by heating from about 60° C. to about 120° C. (temperatures over 100° C. can be attained in a pressure vessel), but even this process may take one or more hours according to the concentration conditions. The formation of hydracrylic acid can be followed analytically in a simple manner by observing the decrease in bromine number. With the help of the saponification number, it can further be ascertained if the hydracrylic acid has partially condensed (about 10 to 15 percent) to polyesters in the aqueous phase.

As soon as the concentration of free acrylic acid is from 5 to 10 percent by weight of the initial amount of aqueous acrylic or hydracrylic acid present, the distillative removal of water can begin. The temperature necessary for this depends on the pressure in the apparatus, but should not exceed 120° C. even in the final stages. Advantageously, a vacuum of from about 10 to 50 mm. Hg and temperatures from about 20° C. to 80° C. in the liquid phase are employed. The distillate as a rule comprises more than 99 percent of water and may contain from 0.5 to 1 percent of acrylic acid together with volatile impurities such as acetic acid and propionic acid which may be present in the aqueous solution being treated. In the distillation it is suitable to employ a column containing packing consisting at least in part of copper.

The process is suitably carried out in a reaction vessel capable of evacuation and having a stirring apparatus and a distillation column thereon. In this case, the acid employed as a catalyst can remain continuously in the reaction vessel. For larger scale production, it is more advantageous to mix and react the aqueous starting solution and acid catalyst in a first reaction vessel which need only be equipped with stirring apparatus, and then, after the required reaction time, to conduct the mixture into an evaluable distillation flask. After conclusion of the two distillation processes, the acid is conducted into an intermediate vessel, optionally over a filter bed of activated charcoal or bleaching earth, from which it is pumped back into the reaction vessel as soon as the next charge, which is reacting during the distillation of the first charge, is introduced into the distillation flask.

The process is carried out in a continuous fashion with particular advantage. A suitable apparatus for this consists of the following parts connected in series.

(1) A mixing vessel into which the aqueous starting solution and the acid catalyst, together with an optional stabilizer, are continually introduced and thoroughly stirred with a stirrer. This vessel can be very small.

(2) A reaction vessel of sufficient size to provide a sufficient reaction time for its contents. If, for example, a reaction time of 10 hours is necessary, this vessel must be 10 times the size of the hourly throughput. Stirring apparatus is not necessary but is of advantage if the vessel can be operated at pressures up to 1 atmosphere.

(3) A vacuum distillation column, having feed means in middle portions thereof, for distillative removal of water. The temperature in the vaporizer must be held below 120° C.: the temperature at the head is determined by the boiling point of water under the vacuum applied. The aqueous distillate is employed for the preparation of the starting solution. The sump phase or residue is continuously introduced into the next piece of apparatus.

(4) A vacuum distillation column, having feed means in middle portions thereof, for cleavage of hydracrylic acid polyester and distillation of acrylic acid. The sump temperature can be raised to over 200° C. for cleavage of the last residues of the polyester and for vaporization of the acrylic acid, but this temperature should not exceed the boiling point or decomposition point of the particular acid catalyst present. At the head of the column, about 90 percent acrylic acid to taken off in vapor form and is condensed. A portion of the distillate is refluxed. By the continuous addition of small amounts of stabilizer at the column head, the formation of polymer in the column can be inhibited. The sump overflow is continuously pumped off and is either purified or in part discarded and brought to volume with fresh acid, and is then re-introduced into the mixing vessel.

All parts of the apparatus should be made of acid resistant materials.

THE DRAWING

The drawing is a self-explanatory schematic illustrative of the process of this invention.

A better understanding of the present invention and of its many advantages will be had by referring to the following specific examples given by way of illustration.

Example 1

800 grams of a 15 percent aqueous solution of acrylic acid were combined with 33 grams of concentrated sulfuric acid and warmed to 90° C. The bromine number of the mixture (i.e. the number of milligrams of bromine consumed by 1 gram of solution) reached a value of 224 after 10 hours, corresponding to about 10 percent of acrylic acid; decreased after 40 hours to 121, corresponding to 5.5 percent acrylic acid; and decreased to 41 after 100 hours, corresponding to 2 percent of acrylic acid.

The mixture was now distilled at 12 mm. Hg in a column one meter long filled with copper turnings. 660 grams of distillate having an acrylic acid content of 0.9 percent, corresponding to 5 percent of the initial amount of acid employed, were obtained at a head temperature of 20° C.

The residue was heated at 150° C. to 170° C. at 12 mm. Hg, whereupon 115 grams of 93 percent acrylic acid, corresponding to a yield of 89 percent of the theory, were distilled off using a column 30 centimeters long filled with copper turnings.

Example 2

1 kilogram of a solution obtained by the gas phase oxidation of acrolein and comprising the following components

|   | G. |
|---|---|
| Acrylic acid | 185 |
| Acetic acid | 35 |
| Propionic acid | 0.5 |
| Maleic acid | 2.5 |
| Acrolein | 22 |
| Water | 755 | was combined with some induline and heated to boiling at atmospheric pressure. 80 grams of a distillate having an acrolein content of 18 grams were removed. The residual solution was combined with 50 grams of concentrated sulfuric acid and heated to 100° C. The bromine number decreased after 18 hours to 128 and after 40 hours to 41, corresponding to a decrease in acrylic acid content from 5.8 percent to 1.8 percent. During this reaction time a very weak stream of air was passed through the solution. Distillation at 12 mm. Hg and 25° C. head temperature gave 700 grams of water having an acrylic acid content of 1.6 percent, corresponding to 6 percent of the initial amount, and 4.5 percent of acetic acid, corresponding with 91 percent of the acetic acid content of the starting solution.

The residue was heated at 17 mm. Hg and 157° C. 186 grams of a 90.3 percent acrylic acid were obtained as the distillate at a head temperature of 45° C. to 50° C. This corresponds to an acrylic acid yield of 91 percent of theory.

The apparatus was like that employed in Example 1.

Example 3

1245 grams of an 18 percent aqueous solution of acrylic acid were combined with 150 grams of concentrated sulfuric acid and heated at 102° C. for 10 hours. The content of free acrylic acid was reduced after this period of time to 1.66 percent. The water was distillatively removed at a vacuum of 20 mm. Hg, causing an increase in the sump temperature to 122° C. 6.6 grams of acrylic acid, or 3 percent of the initial quantity employed, were distilled off with 1000 grams of water.

The residue was gradually heated to 188° C. under a vacuum of 12 mm. Hg. 224 grams of a 92 percent acrylic acid solution were distilled off, corresponding to a yield of 91.5 percent of the original amount.

Example 4

504 grams of a 28 percent aqueous acrylic acid solution were combined with 120 grams of concentrated sulfuric acid and heated for seven hours to 108° C., whereupon the acrylic acid concentration decreased to 2.5 percent. 359 grams of a 2.8 percent aqueous acrylic acid solution were distilled off from the reaction mixture at 25 mm. Hg. The distillate contained 6.7 percent of the initial acrylic acid employed.

The residue was heated to 194° C. under a vacuum of 12 mm. Hg. In this manner, 137 grams of 93.5 percent acrylic acid solution were distilled over at a head temperature of 46° C. This corresponds to a 90 percent yield. A residue remained which weighed 125 grams and essentially comprised sulfuric acid.

Example 5

One kilogram of 20 percent aqueous acrylic acid was combined with 0.6 kilogram of p-toluene sulfonic acid. The mixture was stabilized with induline and heated at reflux for 30 hours at 107° C. After this time, 92 percent of the acrylic acid was converted to the polyester.

Distillation of the mixture using a column filled with copper packing gave three fractions. At a pot temperature of 78° C. most of the water is distilled over as a 1.3 percent aqueous acrylic acid solution. An intermediate fraction comprising 86.5 grams of 20 percent acrylic acid followed at a pot temperature of 153° C. Most of the acrylic acid is distilled over as 97 percent acrylic acid at a pot temperature of 186° C.

The first fraction was re-employed as an extractant liquid for producing further 20 percent acrylic acid. The intermediate fraction was added to the next charge of acrylic acid worked up.

The total amount of acrylic acid recovered, including about 16 grams remaining in the column, was 186 grams, or 93 percent of theory. The yield of 97 percent acrylic acid was 68 percent of theory.

Example 6

90 grams of methane sulfonic acid were added to 150 grams of 20 percent of aqueous acrylic acid. After 22 hours' heating at 115° C. under pressure, more than 90 percent of the acrylic acid employed is converted into the polyester or into hydracrylic acid.

The batch was distilled at 14 mm. Hg and at pot temperatures rising to 177° C. 108 grams of 8 percent acrylic acid and 17 grams of 97 percent acrylic acid were obtained in this fashion. 15 grams of 20 percent acrylic acid were found in a cold trap. The yield of 97 percent acrylic acid thus amounts to 55 percent, while the total yield of acrylic acid recovered is more than 90 percent of theory.

Example 7

A mixture of 95 grams of hydracrylic acid, 130 grams of water, and 50 grams of sulfuric acid was heated for five hours at 170° C. In this manner, the hydracrylic acid was partially converted to acrylic acid and partially to polyester.

On distilling at 14 mm. Hg, a first fraction comprising 3 grams of acrylic acid and 128 grams of water is obtained at a pot temperature of 120° C. 69 grams of a 90 percent acrylic acid solution are obtained as the second fraction at a pot temperature of 206° C. The first fraction and the contents of a cold trap together contain 9 percent of the acrylic acid employed in the process, whereas 87 percent are obtained as concentrated acid. The total yield accordingly is about 96 percent of theory.

Example 8

A solution of 160 grams of acrylic acid in 778 grams of water was combined with 782 grams of orthophosphoric acid and stabilized with induline. During the course of 24 hours' refluxing, the content of free acrylic acid, measured by the bromine number, decreased to about 1 percent by weight.

The mixture was distilled over a column filled with copper turnings at 14–15 mm. Hg. Two fractions were obtained. The first fraction, which was obtained at a pot temperature of 88° C., comprised 772 grams of water and 9 grams of acrylic acid. At a pot temperature of 214° C., a fraction comprising 146 grams of 89 percent acrylic acid was recovered. Hence, the yield of concentrated acrylic acid amounted to 81 percent, whereas the total yield of acrylic acid recovered (including the residue in the column and the content of a cold trap) amounted to 91 percent of theory.

What is claimed is:

1. A process for recovering concentrated acrylic acid from a dilute aqueous solution of a member of the group consisting of acrylic acid and hydracrylic acid, which process comprises combining the dilute aqueous solution with an acid selected from the group consisting of sulfuric acid, an organic sulfonic acid, and a phosphoric acid in an amount which is from about 0.1 to about 5 times the weight of acrylic acid or hydracrylic acid in said solution, whereby the equilibrium formation of hydracrylic acid and a polyester polymer thereof having the repeating unit ($-OCH_2CH_2CO_2-$) is favored in said dilute solution, distilling said dilute solution at temperatures below 120° C. to remove as overhead a product which is substantially all water and to leave as residue a concentrated aqueous solution of said polymer, which is stable at temperatures below 120° C., and then further distilling the residue at temperatures from 120° C. to about 200° C. at sub-atmospheric pressures to depolymerize said polymer, thereby forming a concentrated aqueous solution of acrylic acid, and to distill acrylic acid therefrom.

2. A process as in claim 1 wherein the mixture of aqueous dilute solution and acid combined therewith is heated for at least one hour at a temperature from about 60° C. to 120° C. prior to distillation of water therefrom.

3. A process as in claim 1 wherein sulfuric acid is combined with said dilute aqueous solution.

4. A process as in claim 1 wherein an organic sulfonic acid is combined with said dilute aqueous solution.

5. A process as in claim 1 wherein a phosphoric acid is combined with said dilute aqueous solution.

6. A process as in claim 1 wherein said dilute aqueous solution is a product of the gas phase oxidation of propylene or acrolein.

7. A process as in claim 1 wherein said dilute aqueous solution is distilled prior to the combination of acid therewith to remove volatile impurities therefrom.

8. A process as in claim 1 wherein said dilute aqueous solution comprises less than about 50 percent by weight of acrylic acid or hydracrylic acid.

References Cited

UNITED STATES PATENTS

| 2,469,701 | 5/1949 | Redmon | 260—526 |
|---|---|---|---|
| 2,806,878 | 9/1957 | Luberoff | 260—526 |
| 3,176,042 | 3/1965 | Schnizer et al. | 260—526 |
| 3,264,347 | 8/1966 | Sennewald et al. | 260—533 |
| 3,337,740 | 8/1967 | Gray et al. | 260—526 |

WILBUR L. BASCOMB, Jr., Primary Examiner

U.S. Cl. X.R.

203—7, 15, 34, 35, 38, 73; 260—526 N, 531 R, 533 N

UNITED STATES PATENT OFFICE
CERTIFICATE OF CORRECTION

Patent No. 3,658,895       Dated April 25, 1972

Inventor(s) Karl Heinz Riemann, et. al.

It is certified that error appears in the above-identified patent and that said Letters Patent are hereby corrected as shown below:

In the heading of column 1, line 7, "Rohm & Haas G.m.b.H.," should read -- Rohm G.m.b.H., -- .

Signed and sealed this 12th day of December 1972.

(SEAL)
Attest:

EDWARD M. FLETCHER, JR.         ROBERT GOTTSCHALK
Attesting Officer               Commissioner of Patents